Figure 1:
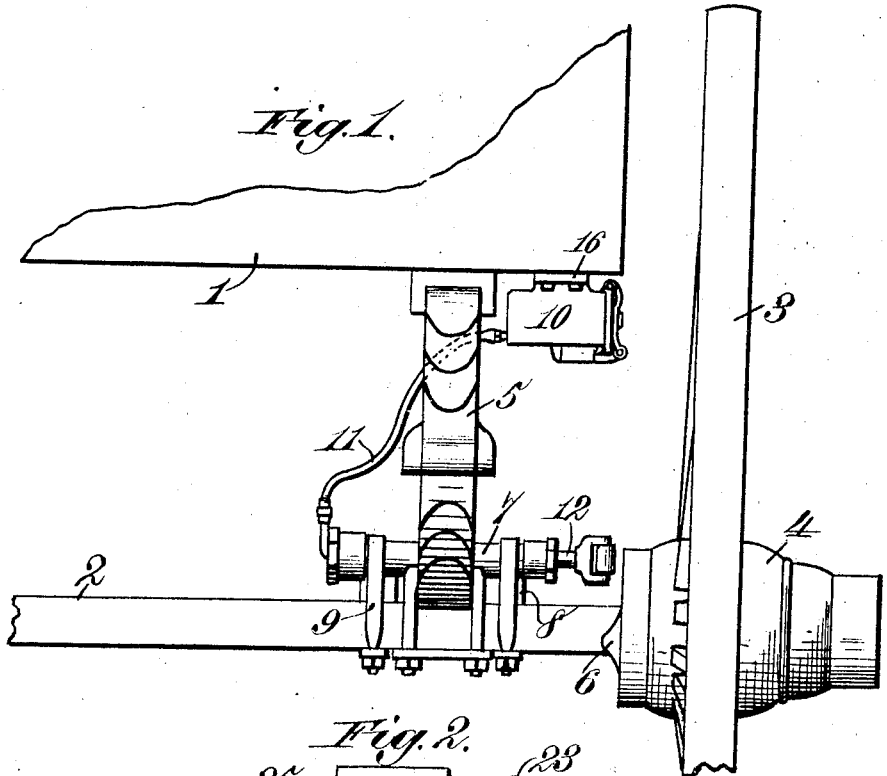

E. A. HENKLE & C. H. DE LA MONTE.
SPEED RECORDER.
APPLICATION FILED NOV. 22, 1907.

914,834.

Patented Mar. 9, 1909.

3 SHEETS—SHEET 1.

Witnesses.

Inventors.
Edward A. Henkle.
Cascious H. de La Monte.
By James L. Norris
Atty.

E. A. HENKLE & C. H. DE LA MONTE.
SPEED RECORDER.
APPLICATION FILED NOV. 22, 1907.

914,834.

Patented Mar. 9, 1909.
3 SHEETS—SHEET 2.

Witnesses.
Robert Everett.

Inventors.
Edward A. Henkle,
Cascious H. de La Monte.
By James L. Norris Atty.

E. A. HENKLE & C. H. DE LA MONTE.
SPEED RECORDER.
APPLICATION FILED NOV. 22, 1907.
914,834.
Patented Mar. 9, 1909.
3 SHEETS—SHEET 3.
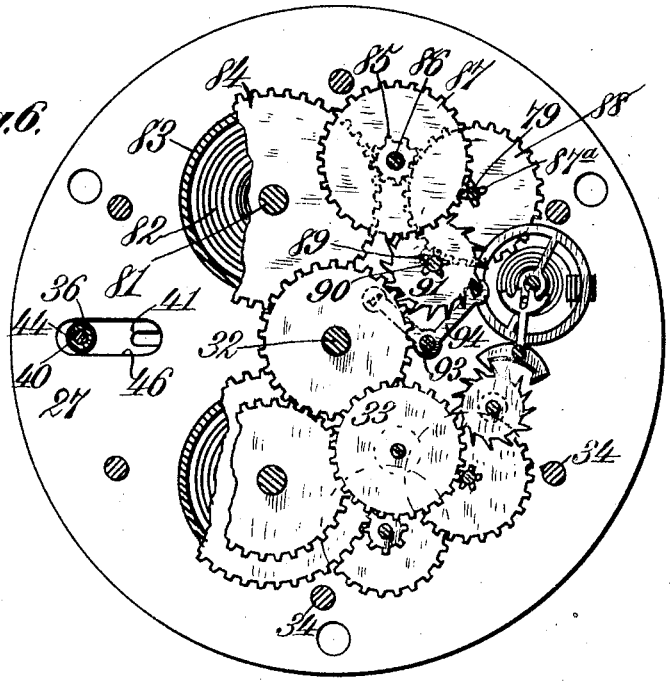
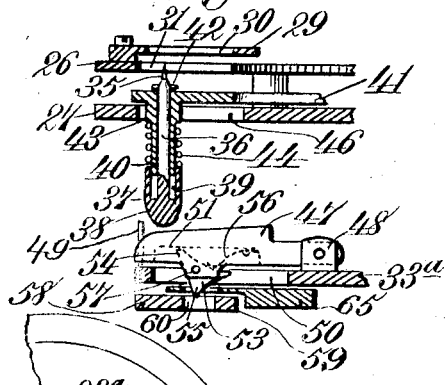
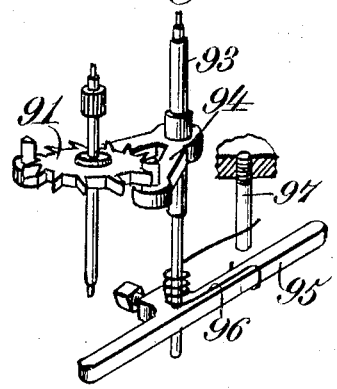
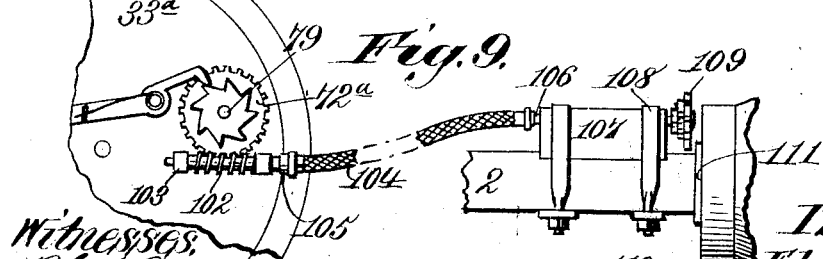

UNITED STATES PATENT OFFICE.

EDWARD A. HENKLE AND CASCIOUS H. DE LA MONTE, OF PHILADELPHIA, PENNSYLVANIA, ASSIGNORS TO INTERNATIONAL SPEED REGISTER CO., OF NEW YORK, N. Y., A CORPORATION OF NEW YORK.

SPEED-RECORDER.

No. 914,83~.  Specification of Letters Patent.  Patented March 9, 1909.

Application filed November 22, 1907. Serial No. 403,348.

*To all whom it may concern:*

Be it known that we, EDWARD A. HENKLE, a citizen of the United States, and CASCIOUS H. DE LA MONTE, a citizen of Mexico, both residing at Philadelphia, in the county of Philadelphia and State of Pennsylvania, have invented new and useful Improvements in Speed-Recorders, of which the following is a specification.

This invention relates to speed recorders, particularly adapted for use in connection with vehicles and for other purposes wherein it is found applicable.

One of the objects of the invention is to provide a speed recording instrument in a manner as hereinafter set forth for not only recording the speed of travel and the distance traveled, but also the time consumed in stoppages, all of which is very valuable as a detector to indicate the working time of the driver, to determine the number of miles the vehicle has traveled and the rates of speed at which the vehicle has been driven, whether fast or slow.

A further object of the invention is to provide a speed recording instrument for the purpose set forth and in a manner as hereinafter referred to, whereby it does not necessitate the mounting of the time and distance mechanisms directly upon the axle of the vehicle, thereby overcoming the imparting of the jars of the axle directly to said mechanisms which otherwise would cause a vibration of said mechanisms, consequently interfering with the making of a perfect record.

A further object of the invention is to provide an instrument of the class referred to in a manner as hereinafter set forth as to enable the mounting of the time and distance mechanisms as well as the operating means for said mechanisms upon the vehicle body and a releasing device for the operating means upon the axle of the vehicle or another part of the vehicle, the releasing device being actuated from a moving part of the vehicle. Such arrangement overcomes the vibration of the time and distance mechanisms as well as operating means therefor.

A further object of the invention is to provide an instrument of the class referred to with a fluid pressure actuated means for releasing the operating means for the time and distance mechanisms to enable the operation of the latter by said operating means, said fluid pressure actuated means being operated from a moving part of the vehicle, and under such conditions it is unusually efficient in use.

With the foregoing and other objects in view, the invention aims to provide a combined speed, distance and time recorder, as termed a speed recording instrument, which shall be simple in its construction, strong, durable, operating in an accurate manner, suspended and supported in a manner as to reduce vibration to the parts to a minimum, thereby obtaining an accurate record, efficient in its use, of small compass, readily set up in operative position, and comparatively inexpensive to manufacture.

Figure 2:
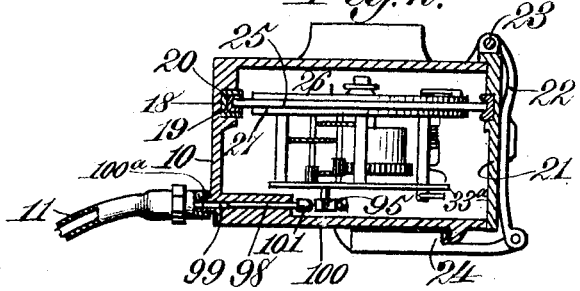
Figure 3:
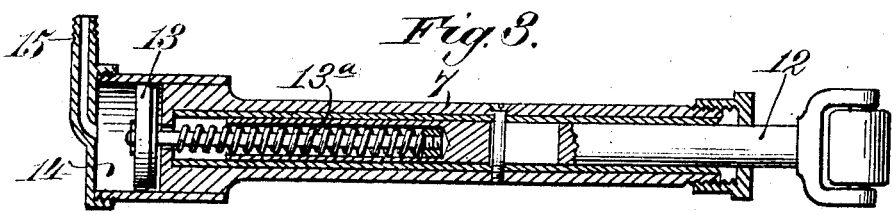
Figure 4:
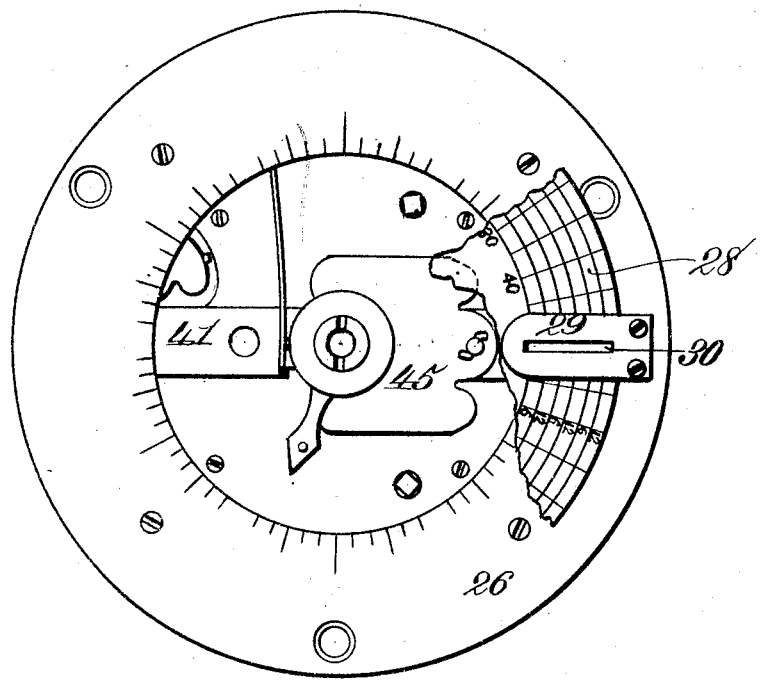
Figure 5:
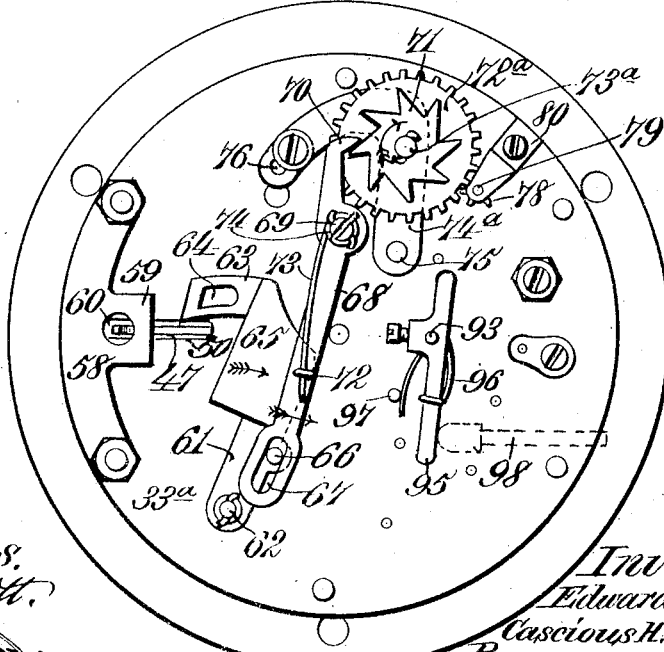

In the accompanying drawings, wherein like reference characters denote corresponding parts throughout the several views, Figure 1 is an elevation of a portion of a vehicle showing the adaptation therewith of a speed recorder in accordance with this invention. Fig. 2 is a cross section of the casing for the various mechanisms, showing these latter suspended within the casing. Fig. 3 is a longitudinal sectional view of a fluid compressor forming an element of the instrument. Fig. 4 is a top plan of the instrument. Fig. 5 is an inverted plan. Fig. 6 is a sectional plan showing the rotating mechanism for the dial and the operating mechanism for the punching mechanism. Fig. 7 is a sectional detail showing the punching mechanism and its shifting means. Fig. 8 is a detail in perspective, showing the releasing device for the operating mechanism for the punching mechanism. Fig. 9 is a view in plan and in side elevation, showing the modified construction of a releasing means for the operating means for the punching mechanism.

Referring to the drawings in detail, 1 denotes the body portion of the vehicle, 2 an axle, 3 a wheel, 4 a hub, 5 one of the vehicle springs, and 6 a cam projecting inwardly from the inner end of the hub and adapted to actuate the fluid compressor which will be hereinafter referred to. The compressor which is generally referred to by the reference character 7, is mounted upon a block 8 placed upon the axle 2 and secured in position with clamps 9.

The time and distance recording mechanisms as well as the operating means therefor are inclosed in a casing 10 which as shown is secured to the lower face of the body 1 of the vehicle and said casing is connected to the compressor 7 through the medium of a conduit 11 in the form of a flexible tubing. By setting up the recorder in a manner as stated the jars of the axle are not imparted directly to the time and distance mechanisms which reduce vibrations to a minimum, and furthermore the time and distance mechanisms are cushioned through the medium of the vehicle springs 5 which also assist in reducing vibrations of the mechanisms to a mimimum. Owing to the manner of arranging the speed recorder, it insures a more accurate record than would be the case if the time and distance mechanisms were mounted directly upon the axle of the vehicle, as is the mode now in general use. As the time and distance mechanisms are cushioned within the casing 10 and as the vehicle body is suspended upon a series of springs, it is evident that by suspending the time and distance mechanisms upon the vehicle body for mounting the same upon said body, there is decidedly less chance of the said mechanisms being caused to vibrate to impair their accuracy than would be the case if such mechanisms were mounted directly upon the axis of the vehicle.

The fluid compressor 7 which as before stated is mounted upon the axle 2 and is of a construction similar to that described in our co-pending application filed Dec. 5, 1907 Serial No. 405,258, and as no claim *per se* to the fluid compressor forms a part of this application, it is thought unnecessary to specifically describe the said compressor 7 with the exception of referring to the plunger 12, piston 13, piston chamber 14 and nipple 15 to which the flexible tubing 11 is coupled.

The casing or box 10 in which the mechanisms are supported is square and provided with off-sets 16 through which extend holdfast devices for securing the casing 10 to the vehicle body. The inner face of the casing or box 10 near the top is formed with a groove 18 in which is mounted a cushioning element 19 carrying a supporting member 20 substantially U-shaped in cross section. The casing or box 10 is furthermore provided with a hinged closure 21 carrying on its inner face a cushioning member 22, pivotally connected to the box or casing as at 23 and provided with means as at 24 for securing the closure 21 in the position shown in Fig. 2, that is to say closing the casing or box 10. The various mechanisms are suspended within the casing or box 10 through the medium of the rectangular frame 25 engaging in the supporting member 20 and the cushioning element 22 when the box or casing is closed. The rectangular frame 25 is secured between a dial supporting ring 26 and an upper pillar plate 27, the former supported upon the latter and the said ring 26 and pillar plate 27 forming a part of the time and distance mechanisms. It is evident from the foregoing manner of suspending the mechanisms within the casing or box 10 that the cushioning elements 19 and 22 further assist in reducing vibration to a minimum. The time and distance mechanisms which are suspended within the casing or box 10 comprise a recording dial, means for rotating said dial at a predetermined rate of speed, say by way of example the dial making a complete revolution every six hours, a punch for making a record upon the dial, means for shifting the punch transversely with respect to the dial, a spring controlled device for vertically shifting the punch to puncture the dial, a releasing means for said device, an operating means for said releasing means, a releasing mechanism for the operating means, and a fluid pressure actuated device for operating said releasing mechanism.

The recording dial which is indicated by the reference character 28 is partly shown in Fig. 4 and is mounted upon the ring 26. The recording dial employed is preferably similar to that disclosed in Letters Patent No. 859,941 of date of July 16, 1907, so under such circumstances it is not necessary to specifically describe the said dial. The ring 26 carries an inwardly extending retaining arm 29 formed with a slot 30 and the said ring 26 is provided with a slot 31 which is in alinement with the slot 30. The slots 30 and 31 provide means for the operation of the punch to be hereinafter referred to when a record is made upon the dial 28 by the punch. The dial 28 extends between the retaining arm 29 and the ring 26 as clearly shown in Fig. 4. The position of the retaining arm 29 with respect to the ring 26 is such as not to retard the rotative movement of the dial 28, the latter being connected at its center to the main staff 32 of a clock train, referred to generally by the reference character 33, the said clock train constituting the means for rotating the dial 28 at a predetermined rate of speed. The clock train 33 is supported between the upper pillar plate 27 and lower pillar plate 33ª. Pillars 34 connect the plates 27, 33ª together.

The punch is indicated by the reference character 35 and is carried by a shank 36 having an enlarged lower end 37, the periphery of which is rounded as at 38. The enlarged end 37 of the shank 36 is formed with an annular groove 39 for the reception of a guide sleeve 40 which depends from a punch shifting arm 41 interposed between the ring 26 and plate 27. The shank 36 is carried by the arm 41 and extends through the sleeve 40 as well as said arm 41 and to connect the shank to the arm 41 a transversely extending pin 42 is provided which extends through the shank 36 and engages the upper face of the arm 41. The sleeve 40 which depends from the arm 41 is enlarged at its upper end to form a shoulder 43 between which and the top edge of the enlarged portion 37 of the shank 36 is positioned a compression spring 44, the latter surrounding the sleeve 40. The shank 36 is vertically movable against the action of the spring 40. The means for vertically moving the shank 36 to cause the punch to compress the dial 28 will be hereinafter referred to. When the shank 36 is vertically shifted, such action will compress the spring 44 and when the shank 36 is released, the expansion of the spring 44 will return the shank to its normal position. The punch shifting arm 41 forms an element of the punch shifting mechanism described in the application co-pending herewith, filed November 9, 1907, Serial No. 401,506, and as no claim is made *per se* to such mechanism, it is thought unnecessary to describe it. The punch shifting mechanism which is referred to generally by the reference character 45 is mounted upon the main staff 32 of the clock train 35 and is adapted to intermittently shift the punch 35 transversely with respect to the dial 28 after each complete revolution of the dial. To allow of the shifting of the punch 35 an elongated slot 46 is provided in the pillar plate 27.

The spring actuated device for vertically shifting the punch to puncture the dial 28 consists of a shifting lever 47 pivoted at its inner end to a vertically extending lug 48 attached to the upper face of the pillar plate 33ª. The outer end of the lever 47 is guided by a vertically extending pin 49 which projects from the upper face of the pillar plate 33ª in close proximity to the edge thereof. The lever 47 projects across an opening 50 formed in the pillar plate 33ª and the outer end of the lever 47 is arranged in vertical alinement with respect to the enlarged end 37 of the shank 36 of the punch 35. The lever 47 is oscillated on its pivot so that when the free end thereof is elevated it will engage the enlarged end 37 of the shank 36 and shift the punch 35 vertically, thereby puncturing the dial 28, that is to say if the dial extends across the slot 31. The lever 47 is provided with a recess, the upper wall of which constitutes an abutment 51 adapted to be engaged by a cam piece 53 formed with projections 54—55. The upper wall of the recess in the lever 47 and which constitutes the abutment 51 is indicated by dotted lines in Fig. 7. Interposed between the cam piece 53 and the abutment 52 is a spring 56. The projection 54 is adapted to engage the abutment 51 and the projection 55 is adapted to be engaged by an extension carried by an actuating member to be hereinafter referred to so as to elevate the lever 47 to actuate the punch. The cam piece 53 is carried by the lever 47 and for such purpose each of the sections of the lever 47 is provided with a depending extension between which the cam piece 53 is pivoted as at 57. Normally the projection 55 depends below the lower face pillar plate 33ª and in the path of the extension of the actuating member. The lever 47 has its top edge inclined downwardly toward its free edge whereby provision is made for obtaining the same length of stroke to the punch when the latter is shifted transversely of the dial so as to puncture the dial at a different point. Below the pillar plate 33ª is positioned a segment-shaped guide plate 58 suitably spaced from the lower face of the pillar plate 33ª and provided with a lateral extension 59 having an opening 60 in which is adapted to normally extend the projection 55. Between the guide plate 58 and the lower face of the pillar plate 33ª is adapted to project an extension of the actuating member. The latter consists of an arm 61 pivoted at one end upon a stud 62 depending from the lower face of the pillar plate 33ª. The arm 61 has its other end provided with an angular extension somewhat curvilinear, said extension being indicated by the reference character 63 and is provided with a slot 64. The extension 63 is adapted to project between the guide plate 58 and the pillar plate 33ª and engage the projection 55, thereby shifting it on its pivot and elevating the lever 47, thereby vertically moving the punch 35. The opening 64 is adapted to receive the projection 55 as clearly shown in Fig. 7, said projection 55 maintaining the extension 63 in the position shown in Fig. 7, until the said extension is withdrawn in the manner as hereinafter referred to. To limit the movement of the extension 63 a stop plate 65 is provided upon the arm 61 and which is adapted to engage the rearward extension 59 of the guide plate 58.

Depending from the arm 61 is a lug 66 which extends through an elongated slot 67 formed in one end of a lever 68 which is pivoted upon a stud 69 depending from the pillar plate 33ª. The other end of the lever 68 is formed with a nose 70 adapted to engage a toothed cam wheel 71. The lever 68 is pivoted at one side of its center, thereby providing one arm longer than the other and said elongated arm carries an eye 72 through which extends one end of a spring 73 while the other end of said spring 73 is coiled around the stud 69 as at 74. From such an arrangement of parts, it is evident that as the cam wheel 71 rotates, the nose 70 will ride upon one of the teeth of the wheel 71, consequently shifting the lever 68 on its pivot against the action of the spring 73. As the lever 68 is shifted on its pivot, the lug 66 will engage the wall of the slot 67 and consequently withdraw the extension 63 from between the guide plate 58 and pillar plate 33ª.

When the nose 70 completely moves off of the tooth of the wheel 71, the spring 73 will shift the lever 68 in the opposite direction, thereby actuating the arm 61 and moving the extension 63 to a position between the guide plate 58 and pillar plate 33ª. As the extension 63 travels between the said plates, it will engage the projection 55, lift the cam piece 53, elevate the lever 47 and shift the punch. The lever 47 is prevented from being retained in an upward position so as to keep the punch elevated by means of the opening 64 in the extension 63 as the projection 55 can enter said opening, as clearly shown in Fig. 7. The cam piece 53 is so disposed that on the rear movement of the extension 63 the cam piece 53 will be rocked upon its pivot against the action of the spring 56; after the extension 63 passes clear of the cam piece, the latter will resume its normal position, that is, in engagement with the abutment 51.

The releasing and actuating means for the said actuated device referred to in the foregoing paragraph embodies the cam wheel 71 and a gear wheel 72ª which carries the star wheel and is mounted upon a stud 73ª depending from the plate 33. The stud 73ª is carried by an adjustable bearing 74ª, said bearing being pivoted as at 75 to the pillar plate 33ª and adjustably connected by a slot and screw connection 76, to the pillar plate 33ª. The bearing 74ª is formed of two arms connected together at one end, one of the arms being pivoted as at 75 and the other of the arms having the slots 76. By such an arrangement the gear wheel 72ª can be adjusted so as to change the length of the period that it requires for the passing off of the nose 70 of the lever 68 from one of the teeth of the wheel 71. If the nose 70 shifts very quickly from one tooth to another tooth of the wheel 71, the tripping of the lever 68 would be at shorter intervals than would be the case if the nose 70 shifts slowly from one tooth to another tooth of the wheel. Under such conditions and in view of the adjustment operation of the punch can be had at different intervals. The operating means for said releasing means referred to in the foregoing paragraph consists of a pinion 78 carried on the lower end of a shaft 79 forming elements of a spring motor mechanism. The shaft 79 projects through the pillar plate 33ª and on the said projecting end is the pinion 78. A bearing 80 which is secured to the lower face of the pillar plate 33ª is provided for the projecting end of the shaft 79. The spring motor mechanism further comprises the main staff 81 to which is attached one end of a power transmitting spring 82, the other end of said spring being secured to a spring barrel 83, the latter being provided with a gear 84 which meshes with a pinion 85 carried by a shaft 86. The shaft 86 has secured thereto a gear 87 which meshes with a pinion 87ª carried by the shaft 79. The latter also carries a gear 88 which engages a pinion 89 fixed to an escapement shaft 90, the latter carrying the escapement wheel 91. The releasing mechanism for said operating means consists of an oscillatory shaft 93 which carries an escapement lever 94, the lever 94 being arranged in operative relation with respect to the escapement wheel 91, as clearly shown in Figs. 6 and 8. The shaft 93 depends below the pillar plate 33ª and carries an oscillatory lever 95 operated in one direction by a fluid pressure operated device to be hereinafter referred to and in the opposite direction through the medium of a spring 96 having one end coiled around the shaft 93 and connected to the lever 95 and its other end bearing against the stud 97 depending from the plate 33. The stud 97 further constitutes means for limiting the movement of the lever 95 in one direction, the direction which the lever takes when it is engaged by the fluid pressure actuated device.

The shafts of the clock train as well as the spring motor mechanism are supported in suitable bearings carried by the pillar plates 27 and 33ª.

The fluid pressure actuated device for operating the releasing mechanism consists of a piston 98 mounted in a chamber 99 formed in the bottom 100 of the casing or box 10. The piston 98 projects from said chamber 99 and has its projecting end enlarged as at 101. The lever 95 is arranged in the path of the enlarged head 101 of the piston 98 so that when the piston 98 is actuated in one direction, it will engage the lever 95 and shift the shaft 93, thereby releasing the motor mechanism and imparting an impulse to the gear wheel 72ª. Projecting from the casing or box 10 is a nipple 100ª which communicates with the chamber 99 and has connected thereto the upper end of the flexible member 11.

From the foregoing construction and arrangement of parts, it is evident that when the compressor is operated in one direction, the fluid will be compressed and drive the piston 98 so as to engage and rock the lever 95, the actuation of the latter will release the spring motor mechanism, causing thereby an impulse to the wheel 72ª. If the vehicle is revolving very rapidly, the cam 6 will engage the plunger 12 at short intervals, consequently causing an almost continuous rotation of the gear wheel 72ª and will rapidly withdraw and release the means for vertically shifting the punch 35. The mechanism is so set up that the punch will make a record on the dial 28, say by way of example every eighth of a mile, so that while the vehicle is traveling, whether fast or slow, the wheel 72ª will be operating and withdrawing the mechanism for vertically shifting the punch until the nose 70 of said mechanism passes off of the cam wheel 71. Such mechanism will be released and the punch operated in the manner as hereinbefore set forth. Immediately after the punch is operated, the shifting mechanism will start to withdraw. The dial is divided in a plurality of spaces indicating fractions of the hour, these spaces preferably indicating five minutes. If the vehicle is traveling very rapidly, the dial would indicate the same owing to the number of punch marks in each space, if the vehicle is traveling slowly the punch marks will be farther apart. If the vehicle is standing still, the dial is rotating but the punching and other mechanisms lie dormant so that one can readily ascertain the length of the stoppage owing to the space between the punctures in the dial, such space indicating the duration of the stoppage.

In Fig. 9 is illustrated a modified form of releasing means for the gear 72ª and when such modification is used, the lever 95 is dispensed with as well as the lever 94, the gear wheel 72ª being connected directly to the shaft 79. The modified form of releasing means consists of a worm shaft 102 journaled in bearings 103 depending from the pillar plate 33ª. The worm shaft 102 engages with the teeth of the wheel 72ª and prevents it from rotation unless the worm shaft 102 is revolving. The actuation of the worm shaft 102 is had through the medium of a flexible shaft 104 attached to the worm shaft 102 as at 105 and connected to the shaft 106 journaled in a bearing block 107 screwed to the axle 2 by the clamps 108. The shaft 106 projects from one end of the block 107 and carries a star wheel 109 which is engaged by a projection 110 carried on the inner end 111 of the wheel hub. From such construction it is evident that during the rotation of the wheel, the projection 110 will engage the star wheel 109, actuating the same, which in turn will revolve the shaft 106, the latter imparting motion to the shaft 104 and shifting the worm wheel 102, consequently releasing the wheel 72ª, the spring motor mechanism and then actuating said wheel which in turn will cause the nose 70 of the lever 68 to move off the star wheel 71.

As before stated the actuation of the piston 98 in one direction is had through the medium of the operation of the compressor to compress the fluid. This operation is had by removing the piston 13 within the chamber 14, the movement of the piston 13 being had by the shifting of the plunger inwardly owing to the engagement with the plunger of the cam 6. When the cam 6 passes off of the plunger 12, the piston 13 is shifted in the opposite direction by the spring 13ª which causes a partial vacuum in the flexible tube 11 and also draws the piston 98 within the chamber 99 so that when the plunger 12 is again engaged by the cam 6, the piston 98 will again be actuated to oscillate the lever 95.

What we claim is:—

1. A speed recorder comprising a dial punching means, a normally locked spring actuated driving mechanism for and independent of said means, a releasing means for said driving mechanism, a normally locked operating means for said releasing means, an intermittently operated releasing mechanism for said operating means, and a fluid pressure actuated device for operating said releasing mechanism.

2. A speed recorder comprising a vertical operable dial punching mechanism, a normally locked spring actuated means independent of and operating in a plane at right angles with respect to said dial punching mechanism for operating the latter, a normally locked combined releasing and operating means for the operating mechanism for said punch, and a fluid pressure operating mechanism for throwing into operation said combined releasing and operating means.

3. A speed recorder comprising a dial punching mechanism, a normally locked spring actuated operating means therefor, said operating means independent of said dial punching mechanism, a normally combined releasing and operating means for the operating means for the punching mechanism, and a fluid pressure operated device for throwing said combined releasing and operating means into operation.

4. A speed recorder comprising a rotatable dial carrier, a spring motor mechanism for continuously rotating said dial carrier, a dial punching mechanism, means embodying an oscillatory lever having an extension for operating said dial punching mechanism in one direction thereby puncturing the dial upon the carrier, a rotatable means normally in an inactive position for operating said operating means when said rotatable means is active, a spring motor mechanism normally in an inactive position and adapted when active to operate said rotatable means, and means for rendering said second mentioned spring motor mechanism active.

5. A speed recorder comprising a rotatable dial carrier, a spring motor mechanism for continuously rotating said dial carrier, a dial punching mechanism, means for embodying an oscillatory lever having an extension operating said dial punching mechanism in one direction thereby puncturing the dial upon the carrier, a rotatable means normally in an inactive position for operating said operating means when said rotatable means is active, a spring motor mechanism normally in an inactive position and adapted when active to operate said rotatable means, and a fluid pressure actuated mechanism for rendering said second mentioned spring motor mechanism active.

6. A speed recorder comprising a dial punch, an oscillatory means operating in a plane at right angles with respect to said dial punch and adapted when operating in one direction to actuate the punch to puncture a dial, said means independent of the dial punch and embodying an actuating spring for shifting the same toward the punch, mechanism engaging with said means for intermittently shifting it in the opposite direction, a normally locked mechanism adapted when released to operate said shifting mechanism, and means for releasing said normally locked mechanism.

7. A speed recorder comprising a dial punch, an oscillatory means operating in a plane at right angles with respect to said dial punch and adapted when operating in one direction to actuate the punch to puncture a dial, said means independent of the dial punch and embodying an actuating spring for shifting the same toward the punch, mechanism engaging with said means for intermittently shifting it in the opposite direction, a normally locked mechanism adapted when released to operate said shifting mechanism, and a fluid pressure actuated mechanism for releasing said normally locked mechanism.

8. A speed recorder comprising means for rotating a dial at a predetermined rate of speed, operating means therefor, a dial punch a normally locked spring actuated mechanism adapted when released to actuate the punch whereby the dial is punctured, said spring actuated mechanism independent of the dial punch an intermittently rotatable and normally locked mechanism for releasing said spring actuated mechanism, and means for intermittently locking and releasing said rotatable mechanism.

9. A speed recorder comprising means for rotating a dial at a predetermined rate of speed, a reciprocatory punch for intermittently puncturing the dial, a pivoted lever for actuating said punch in one direction, means for moving the punch in the opposite direction, said lever provided with a recess, the upper wall of which constitutes an abutment, a shiftable member engaging with said abutment for operating the lever causing thereby the moving of the punch in one direction to puncture the dial, mechanism for operating the shiftable member, and means for operating said mechanism.

10. A speed recorder comprising means for rotating a dial at a predetermined rate of speed, a reciprocatory punch for intermittently puncturing the dial, a pivoted lever for actuating said punch in one direction, means for moving the punch in the opposite direction, said lever provided with a recess, the upper wall of which constitutes an abutment, a shiftable member engaging with said abutment for operating the lever causing thereby the moving of the punch in one direction to puncture the dial, mechanism for operating the shiftable member, and a fluid pressure operated means for operating said mechanism.

11. A speed recorder comprising means for rotating a dial at a predetermined rate of speed, a reciprocatory punch for intermittently puncturing the dial, a pivoted lever for actuating said punch in one direction, means for moving the punch in the opposite direction, said lever provided with a recess, the upper wall of which constitutes an abutment, a shiftable member engaging with said abutment for operating the lever causing thereby the moving of the punch in one direction to puncture the dial, mechanism for operating the shiftable member, means for operating said mechanism, a normally locked spring actuated mechanism for operating said member, a releasing means for said spring actuated mechanism, and means for operating said releasing means.

12. A speed recorder comprising means for rotating a dial at a predetermined rate of speed, a reciprocatory punch for intermittently puncturing the dial, a pivoted lever for actuating said punch in one direction, means for moving the punch in the opposite direction, said lever provided with a recess, the upper wall of which constitutes an abutment, a shiftable member engaging with said abutment for operating the lever causing thereby the moving of the punch in one direction to puncture the dial, mechanism for operating the shiftable member, means for operating said mechanism, a normally locked spring actuated mechanism for operating said member, a releasing means for said spring actuated mechanism, and a fluid pressure operated mechanism for operating said releasing means.

13. A speed recorder comprising means for rotating a dial at a predetermined rate of speed, a reciprocatory punch for intermittently puncturing the dial, a pivoted lever for actuating said punch in one direction, means for moving the punch in the opposite direction, said lever provided with a recess, the upper wall of which constitutes an abutment, a shiftable member engaging with said abutment for operating the lever causing thereby the moving of the punch in one direction to puncture the dial, a normally locked spring actuated mechanism for operating said member, a releasing means for said spring actuated mechanism, a normally locked operating means for said releasing means, an intermittently operated releasing mechanism for said normally locked operating means, and means for operating said intermittently operated releasing mechanism.

14. A speed recorder comprising means for rotating a dial at a predetermined rate of speed, a reciprocatory punch for intermittently puncturing the dial, a pivoted lever for actuating said punch in one direction, means for moving the punch in the opposite direction, said lever provided with a recess, the upper wall of which constitutes an abutment, a shiftable member engaging with said abutment for operating the lever causing thereby the moving of the punch in one direction to puncture the dial, a normally locked spring actuated mechanism for operating said member, a releasing means for said spring actuated mechanism, a normally locked operating means for said releasing means, an intermittently operated releasing mechanism for said normally locked operating means, and a fluid pressure actuated device for operating said intermittently operated releasing mechanism.

15. A speed recorder comprising means for rotating a dial at a predetermined rate of speed, a reciprocatory punch for intermittently puncturing the dial, a pivoted lever for actuating said punch in one direction, means for moving the punch in the opposite direction, said lever provided with a recess, the upper wall of which constitutes an abutment, a shiftable member engaging with said abutment for operating the lever causing thereby the moving of the punch in one direction to puncture the dial, an oscillatory means operating in a plane at right angles with respect to said punch and adapted when operated to actuate the said member, said oscillatory means embodying an actuating spring for shifting the same toward the punch, mechanism engaging with said oscillatory means for intermittently shifting it in the opposite direction, a spring motor mechanism for operating said shifting mechanism, said spring motor mechanism being normally inactive, and means for intermittently releasing said spring motor mechanism causing thereby the operation of the shifting mechanism.

16. A speed recorder comprising means for rotating a dial at a predetermined rate of speed, a reciprocatory punch for intermittently puncturing the dial, a pivoted lever for actuating said punch in one direction, means for moving the punch in the opposite direction, said lever provided with a recess, the upper wall of which constitutes an abutment, a shiftable member engaging with said abutment for operating the lever causing thereby the moving of the punch in one direction to puncture the dial, an oscillatory means operating in a plane at right angles with respect to said punch and adapted when operating to actuate the said member, said oscillatory means embodying an actuating spring for shifting the same toward the punch, mechanism engaging with said oscillatory means for intermittently shifting it in the opposite direction, a spring motor mechanism for operating said shifting mechanism, said spring motor mechanism being normally inactive, and a fluid pressure actuated mechanism for intermittently releasing said spring motor mechanism.

17. A speed recorder comprising a dial punch, a lever arranged below and extending at right angles with respect to said punch and adapted when actuated to move the punch to puncture a dial, means for shifting the punch in the opposite direction, a pivoted member engaging with said lever for actuating it, an oscillatory means adapted when operated in one direction to actuate said member causing thereby the shifting of the lever, said oscillatory means embodying an actuating spring for shifting the same toward said member, mechanism engaging with said oscillatory means for intermittently shifting it in the opposite direction, a normally locked spring motor mechanism adapted when released to operate said shifting mechanism, and means for intermittently releasing the said spring motor mechanism causing thereby the operation of the shifting mechanism.

18. A speed recorder comprising a dial punch, a lever arranged below and extending at right angles with respect to said punch and adapted when actuated to move the punch to puncture a dial, means for shifting the punch in the opposite direction, a pivoted member engaging with said lever for actuating it, an oscillatory means adapted when operated in one direction to actuate said member causing thereby the shifting of the lever, said oscillatory means embodying an actuating spring for shifting the same toward said member, mechanism engaging with said oscillatory means for intermittently shifting it in the opposite direction, a normally locked spring motor mechanism adapted when released to operate said shifting mechanism, and a fluid pressure actuated mechanism for intermittently releasing said spring motor mechanism.

19. A speed recorder comprising a pair of pillar plates, a dial-rotating mechanism interposed between the said plates, a dial-punching mechanism interposed between said plates, operating means for said dial-punching mechanism supported by one of said plates, a combined releasing and shifting means for said operating means, said combined releasing and shifting means supported by one of said plates, a normally locked spring motor mechanism interposed between said plates and connected with said combined releasing and shifting mechanism for actuating it when the spring motor mechanism is released, and a fluid-pressure actuated device for releasing said spring motor mechanism.

In testimony whereof we have hereunto set our hands in presence of two subscribing witnesses.

EDWARD A. HENKLE.
CASCIOUS H. DE LA MONTE.

Witnesses:
JUNIUS HOWE,
WALTER H. JACKSON.